3,050,455
OXIDATION OF RESIDUAL PETROLEUM WAXES
John Leslie Vosser, Sunbury-on-Thames, England, assignor to The British Petroleum Company Limited, London, England, a British joint-stock corporation
No Drawing. Filed July 20, 1959, Ser. No. 828,075
Claims priority, application Great Britain July 23, 1958
11 Claims. (Cl. 208—3)

This invention relates to the oxidation of residual petroleum wax, i.e. the wax present in the residue left in the vacuum distillation of crude petroleum. Residual wax is largely microcrystalline in structure and is often called microcrystalline wax or microwax. It is to be distinguished from the paraffin wax obtained from petroleum distillates which is largely crystalline in structure.

The invention consists in carrying out the oxidation of the residual wax using a paraffin wax oxidate as catalyst.

The oxidation temperature should preferably be maintained at from 140° to 200° C. and the oxidation may conveniently be effected by air-blowing the molten wax, preferably at a rate sufficient to maintain the wax in a state of agitation. The paraffin wax oxidate catalyst may conveniently be added to the molten wax feedstock while the air is passing through it.

The reaction should preferably be continued until the oxidised product has a saponification number of at least 5 mg. KOH/g.

The residual wax feedstock may advantageously be in the form of a residual slack wax, i.e. a material produced by dewaxing a deasphalted vacuum residue, e.g. at a temperature below 0° C., or a recrystallised residual slack wax, i.e. a slack wax which has been at least partly de-oiled by recrystallisation e.g. at a temperature in the range 0°–15° C. When using such feedstocks, an air rate of at least 15 litres, and preferably not more than 450 litres, per hour per 100 g. of feedstock has been found to be particularly suitable.

Paraffin wax oxidates are well known and readily available materials which can easily be prepared by several established methods e.g. by air-blowing paraffin wax at elevated temperature in the presence of potassium permanganate as a catalyst. The crude oxidation product contains acids, esters, aldehydes, ketones and alcohols in addition to unchanged material. If desired, the oxidised portion may be extracted from the unchanged material by means of a solvent (e.g. methanol) in which the oxidised materials are soluble and the unchanged material is not. The paraffin wax oxidates used should preferably have acid values in the range 20–200 mg. KOH/g. and they should preferably be used in an amount of 5–20% by weight of the wax feedstock.

A number of examples of the invention will now be described. In all cases the reaction was carried out in a jacketed glass tube fitted with a glass sinter at the base to disperse the air. A liquid of suitable boiling point was refluxed into the jacket surrounding the reactor tube to provide suitable heating. The whole apparatus was lagged to prevent heat loss.

*Example 1*

Feedstock: Single stage recrystallised residual slack wax, melting point 160° F., penetration at 25° C. (ASTM D1321) 25 mm./10.
Oxidation temperature: 150° C.
Air rate: 70 litres/hour/100 g. feedstock.
Catalyst: 10% by weight of the feedstock of a paraffin wax oxidate of acid value (I.P. 1/58) 112 mg. KOH/g.

The product had a saponification number (I.P. 1/36) of 22 mg. KOH/g. after 24 hours.

*Example 2*

Example 1 was repeated using an air rate of 100 litres/hour/100 g. feedstock and a paraffin wax oxidate of acid value 42 mg. KOH/g. After 20 hours the product had a saponification number of 7 mg. KOH/g. and an acid value of 1.5 mg. KOH/g.

*Example 3*

Feedstock: A slack wax obtained by dewaxing a Middle Eastern deasphalted vacuum residue with MEK/toluene at −34° C.
Oxidation temperature: 150° C.
Air rate: 110 litres/hour/100 g. feedstock.
Catalyst: 10% by weight of the feedstock of a paraffin wax oxidate of acid value 31 mg. KOH/g.

The product had a saponification number of 14 mg. KOH/g. and an acid value of 2 mg. KOH/g. after 24 hours.

*Example 4*

Example 3 was repeated using a paraffin wax oxidate of acid value 156 KOH/g. After 24 hours the product had a saponification number of 13 mg. KOH/g. and an acid value of 5 mg. KOH/g.

*Example 5*

Feedstock: As in Example 1.
Oxidation temperature: 150° C.
Air rate: 100 litres/hour/100 g. feedstock.
Catalyst: 10% by weight of the feedstock of a paraffin wax oxidate of acid value 147 mg. KOH/g. and saponification number 186 mg. KOH/g. (This oxidate was a methanol extract of a crude oxidate.)

The product after 12 hours had a saponification number of 31 mg. KOH/g. and an acid value of 20 mg. KOH/g., and after 24 hours a saponification number of 10 mg. KOH/g. and an acid value of 7 mg. KOH/g.

The products produced according to the invention are useful as emulsifying and dispersing agents. An example of their use is described in the specification of co-pending U.S. patent application No. 828,078, filed July 20, 1959.

I claim:
1. A process for oxidizing residual petroleum wax derived from the residue left in the vacuum distillation of crude petroleum and having a micro-crystalline structure to produce emulsifying agents, which comprises oxidizing said residual petroleum wax at temperatures in the range of about 140° to 200° C. using as a catalyst a paraffin wax oxidate having acid values in the range of 20–200 mg. KOH/g., said paraffin wax oxidate being derived from the oxidation of paraffin wax which is largely crystalline in structure and which is obtained from petroleum distillates, the quantity of said catalyst being at least about 5 percent by weight of the residual petroleum wax feedstock, and continuing oxidation until the oxidized product has a saponification number of at least 5 mg. KOH/g.

2. A process according to claim 1, in which the oxidation is effected by air-blowing the residual petroleum wax feedstock in a molten state.

3. A process according to claim 2, in which the rate of air-blowing is sufficient to maintain the residual petroleum wax in a state of agitation.

4. A process according to claim 2, in which the paraffin wax oxidate catalyst is added to the molten residual petroleum wax feedstock while the air is passing through it.

5. A process according to claim 1, in which the residual petroleum wax feedstock is a residual slack wax.

6. A process according to claim 5, in which the oxidation is effected by blowing air through the molten residual petroleum wax feedstock at a rate of 15–450 litres per hour per 100 g. of feedstock.

7. A process according to claim 1, in which the residual petroleum wax feedstock is a recrystallised residual slack wax.

8. A process according to claim 7, in which the oxidation is effected by blowing air through the molten residual petroleum wax feedstock at a rate of 15–450 litres per hour per 100 g. of feedstock.

9. A process according to claim 1, in which the paraffin wax oxidate catalyst is a solvent extract of a crude paraffin wax oxidate.

10. A process according to claim 9, in which the solvent is methanol.

11. A process according to claim 1, in which the amount of paraffin wax oxidate catalyst used is 5–20% by weight of the residual petroleum wax feedstock.

References Cited in the file of this patent

UNITED STATES PATENTS

| | | |
|---|---|---|
| 2,674,613 | Nelson | Mar. 9, 1950 |
| 2,729,665 | Buckmann | Jan. 3, 1956 |

FOREIGN PATENTS

| | | |
|---|---|---|
| 324,189 | Great Britain | Jan. 23, 1930 |